Jan. 25, 1966     W. N. CARSON, JR     3,231,810
CURRENT-RESPONSIVE REGULATOR
Filed Feb. 27, 1961
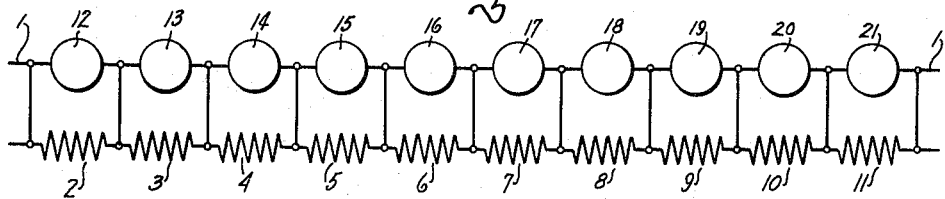
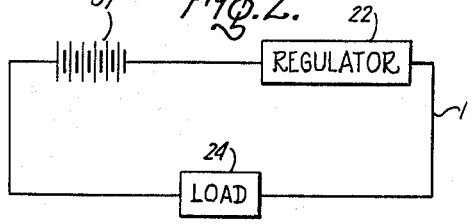
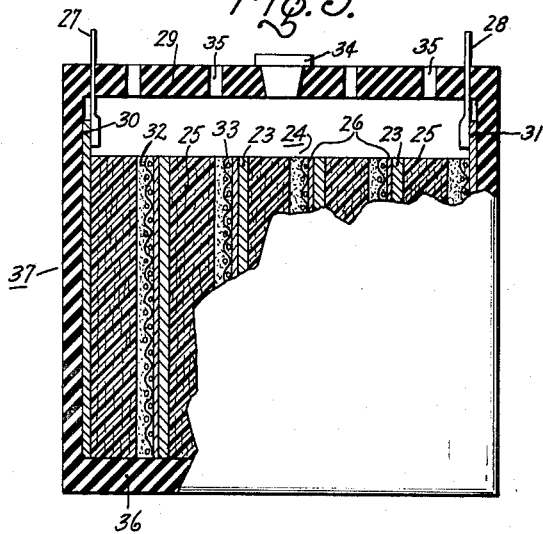
Inventor
William N. Carson, Jr
by Paul G. Frank
His Attorney

United States Patent Office

3,231,810
Patented Jan. 25, 1966

3,231,810
CURRENT-RESPONSIVE REGULATOR
William N. Carson, Jr., Scotia, N.Y., assignor to General Electric Company, a corporation of New York
Filed Feb. 27, 1961, Ser. No. 91,797
4 Claims. (Cl. 320—39)

This invention pertains generally to a simple device for regulating the output of electrical power generating machinery. More particularly, the invention is directed to a current-responsive device for the regulation of a battery, which device is especially suitable for regulation of a high-discharge rate primary type battery.

Certain applications for a primary battery contemplate continuous operation of the battery until complete discharge or until the battery is rendered inoperative for other reasons. For example, a primary battery may be employed to power a military torpedo or to provide a source of power in a proximity fuse for military projectiles. In such applications, it is often desirable to regulate the current flow from the battery for various reasons, and it is obvious that regulation is needed only for the life of the battery. Hence, a single-use regulator is adequate for the regulation of a primary type battery in such applications as described. The known regulators are designed for reuse, however, and contain unnecessary and often complex elements to achieve repeated regulation. More particularly, even relatively simple regulators contain solenoids, relays, vacuum tubes, solid state elements and other means for repeatedly controlling the power output of regulated devices.

It is the principal object of the invention to provide a simplified regulator for a primary battery.

It is another important object of the invention to provide a regulator for a primary battery which contains no moving parts and which performs dependably over a wide variety of ambient conditions.

It is still another important object of the invention to provide a battery regulator which is small in size, compact in arrangement, and of rugged construction so as to be especially suitable for military, emergency, and space applications.

Briefly, the present regulator comprises an arrangement of low melting point fuses and resistors which operates to add resistance to the battery circuit in response to an increase of battery current. More particularly, the arrangement of fuses and resistors in the regulator permits one or more of the fuses to melt with an excessive increase in the battery current whereupon the battery current is shunted through additional resistance in the regulator. The present regulator is particularly appropriate for use with a high-discharge rate liquid electrolyte battery of the deferred action type.

The deferred action battery is known and is activated by immersing the electrodes in the liquid electrolyte or by dumping electrolyte into a jar or case containing the electrodes. This type battery is generally designed to supply a minimum power output under the most extreme conditions of operation. As a specific example, the magnesium-cuprous chloride sea water battery is designed to furnish its rated power even in frigid oceans and in water of low salinity. The battery output is greater at higher temperatures of the sea water electrolyte. Likewise, an increase in the salinity of the electrolyte lowers the internal resistance of the battery which increases the battery output. Still further, the electrochemical reaction itself generates heat which raises the power output during operation of the battery. For these and other reasons, it is desirable to limit the battery output when it increases beyond a prescribed limit.

The invention may be practiced in a preferred embodiment as illustrated in the following description taken in connection with the accompanying drawings. There is described in the preferred embodiment one form of the regulator of the invention being operatively associated with a magnesium-cuprous chloride sea water battery.

FIGURE 1 is a schematic view of the preferred regulator circuit.

FIGURE 2 comprises a schematic view of an electrical circuit which comprises a magnesium-cuprous chloride sea water battery, the regulator, and a load for the battery.

FIGURE 3 is a plan view partially in section of one form of the magnesium-cuprous chloride sea water battery.

The schematic view of FIGURE 1 illustrates one circuit for the regulator which comprises a plurality of series-connected fuses, each fuse being shunted by a resistor. In the circuit, power leads 1 are connected to a series of parallel circuits of resistors 2–11 and fuse elements 12–21, each parallel circuit containing a fuse and a resistor such as 12 and 2, respectively. The power leads and the electrical conduction between the various resistors and fuses of the circuit can be made in a conventional manner by known techniques. Likewise, a small compact regulator can be fabricated according to the circuit arrangement simply by affixing the fuses and resistors to an insulating substrate and attaching terminals thereto for the power leads. Alternately, a suitable regulator can be prepared with a printed circuit substrate merely by soldering resistors 2–11 and fuses 12–21 to the substrate. The fuses employed in the regulator are solid electrically conductive elements which if heated above the melting point of the fuse material cause the material to flow and break the circuit. Fuse materials are well known and generally comprise metals, metallic alloys, and inorganic salts having relatively low melting points and good electrical conductivity characteristics. Typical fuse metals include lead, aluminum, copper, and tin. Metallic alloys commonly employed as fuse materials include binary, ternary, quaternary, and quinary mixtures of bismuth, lead, tin, cadmium, indium, and other metals. The nitrate, chloride, and chloride salts of strontium and barium are examples of suitable inorganic salts for the fuse material. The selection of a particular rating fuse for the regulator will depend upon the desired current to be furnished from the battery before the fuse is melted. It will be obvious that different rating fuses can be used in the regulator circuit if advantageous to do so in a particular application.

The operation of the regulator can perhaps best be illustrated by referring to FIGURE 2 wherein for illustration purposes the regulator of FIGURE 1 is employed in the circuit. Regulator 22 is placed in series with battery 37 and load 24, which arrangement limits the current and hence the voltage applied to the load when the battery voltage increases beyond a prescribed limit. Voltage changes due to load changes during operation of the battery are not intended to be compensated by the device. Also, as stated previously, no provision is necessary in the regulator for under-voltage conditions since the battery itself is designed to deliver the correct voltage and current under minimum temperature and salinity conditions. Thus, the regulator compensates only for a voltage increase due to such factors as an increase in the electrochemical reaction or decrease of the internal battery resistance. In the operation of the regulator, an excessive increase in the load current caused by a battery voltage increase causes one or more of the fuses to melt. This removes the shunt path for the corresponding resistors thereby increasing the resistance of the regulator and decreasing the current to the load. The melting of fuses will continue until the current from the battery decreases below a predetermined value or until all fuses have melted. If all fuses are of equal rating, the fuses can be expected to melt randomly with the thinnest or weakest fuse in the regulator melting first as the result of small differences introduced during fabrication of the regulator. Random destruction of fuses does not disrupt operation of the regulator however, which is an advantage of the particular design illustrated in the drawings.

The regulator of the invention can be designed with fewer or more parallel circuits than illustrated in FIGURE 1 and, by substitution of different rating fuses and resistor elements, can be made to regulate any reasonable voltage range. Thus, regulator design is specific for a given application and can be achieved through routine mathematical calculation. More particularly, design calculations for the ten-step regulator of FIGURE 1 will be shown to further illustrate the practice of the invention. First, it will be assumed that it is desirable to limit the voltage excess from the battery in the circuit of FIGURE 2 to a 1-volt excess for a load device having a resistance of 2.2 ohms. It will also be assumed that the maximum current to the load device is 3.18 amperes at a voltage of approximately 6.8–7 volts. The particular battery employed for this illustration and to be described in greater detail hereinafter is found experimentally to operate in the range of 6.9–8 volts. By simple Ohm's law calculation from the stated assumptions, the total resistance to be supplied in a regulator to limit the maximum load current to 3.18 amperes at a voltage excess of 1 volt is 0.314 ohm. If ten resistors all having approximately the same resistance are employed in the regulator, the resistance of an individual resistor will be 0.0314 ohm. To calculate fuse resistance, it will be assumed that the total resistance for a regulator not having any melted or "blown" fuses, will be 0.1 ohm. The total fuse resistance can be calculated again from Ohm's law relationship for parallel circuits as follows:

$$\frac{1}{R_t} = \frac{1}{R_r} + \frac{1}{R_s}$$

wherein $R_t$ = total resistance of the circuit
$R_r$ = total resistance of the resistor elements in the regulator
$R_s$ = total resistance of the fuse elements in the regulator Inserting the values above calculated and assumed in the equation and solving for $R_s$:

$$\frac{1}{0.1} = \frac{1}{0.314} + \frac{1}{R_s}$$

$$R_s = 0.146 \text{ ohm}$$

If the individual fuse resistances in the ten-step regulator are equal, the individual fuse resistances will be simply 0.0146 ohm. The voltage across the regulator with all fuses operating will be the product of 3.18 amperes times the total fuse resistance of 0.1 ohm which equal 0.318 volt. The shunt current is equal to the voltage across the regulator divided by the total fuse resistance which equals 2.18 amperes.

A magnesium-cuprous chloride sea water battery having the operating characteristics described in the above design calculations for the regulator is shown in FIGURE 3. The battery 37 comprises generally an assembly of a case 36 for containing the liquid electrolyte and repeating unit cells, each unit cell comprising a magnesium anode 23, a cuprous chloride cathode 24, and an inter-electrode separator 25. It will be noted from reference to FIGURE 3 that the cathode element for a unit cell is in electrical contact through means of a thin copper plate 26 with the magnesium anode of the next adjacent unit cell. External electrical connection is made to the series of unit cells by connecting leads 27 and 28 projecting through the cover 29 of the battery case 36. Connecting lead 27 preferably comprises a 0.020 inch copper wire conductor and is soldered to magnesium anode 30 at one end of the series of unit cells. Connecting lead 28 is soldered to copper collector plate 31 constituting the final member at the opposite end of the series of unit cells. Connecting leads 27 and 28 can be insulated to reduce possible corrosion in the leads by the sea water during operation of the battery and to prevent direct electrical connection between said connecting leads through the liquid electrolyte. Magnesium anode 23 comprises a rectangular flat sheet of approximately 0.030 inch thickness with length and width dimensions approximating the interior cell dimensions. Cuprous chloride cathode 24 comprises a three-member assembly wherein a pressed cuprous chloride layer 32 is embedded in a copper screen 33, the copper screen being soldered directly to a 0.002 inch thick rectangular copper collector plate 26. The length and width dimensions of the cuprous chloride cathode assembly are approximately the same as for the magnesium anode. The cathode assembly is fabricated by first soldering the screen element 33 to the collector plate 26 preferably with soft solder such as a 60–40 lead-tin mixture. The cuprous chloride layer 32 is prepared by pressing a dry powdered cuprous chloride mixture onto the screen member 33 atttached to the collector plate 26, at pressures of approximately 20,000 lbs. per square inch or more. The particular inter-electrode spacer 25 employed in the described embodiment comprises a bibulous cellulose structure of approximately 0.050 inch thickness with other dimensions being approximately the same as hereinbefore described for the electrode elements. A plug 34 is inserted in the cover of the battery case to permit addition of the sea water electrolyte. Additionally, vent holes 35 are provided for escape of the gases formed during the electrochemical reaction of the battery. The battery case is preferably fabricated from a formable non-conducting solid such as rubber, glass, polymers, etc. Likewise, it is preferred to insulate the end battery plates 27 and 28 with a tape wrap or coating of an unreactive unsoluble organic polymer in such a manner as to contain the electro-chemical reaction to the facing surfaces of these members which are in direct contact with an adjacent member of the unit cell. Thus, both the rear sides and top portions of said end plates would have the electrically insulating covering described. A battery of the described design can be fabricated having approximately 200–250 milliamperes per square inch capacity and which will achieve approximately 90% operating voltage within a few seconds after activation.

From the foregoing description, it will be apparent that a simplified regulator adaptable for use with a primary battery has been provided. Furthermore, a novel method has been shown for controlling the power output of a primary battery. It is not intended to limit the invention to the preferred embodiments above since it will be obvious to those skilled in the art that certain modifications of the present teaching can be made without departing from the true spirit and scope of the invention. For example, although a simple parallel arrangement of fuses and resistors is preferred for the regulator circuit of the invention, it is known that more complex equivalent circuits can be designed which will operate in approximately the same manner. Likewise, although the preferred application for the present regulator is in combination with the primary battery, the device can be employed without modification for a secondary type battery. It is intended to limit the present invention, therefore, only to the scope of the following claims.

What I claim as new and desire to secure by Letters Patent of the United States is:

1. A current regulator which comprises at least two parallel electrical circuits connected in series, each parallel electrical circuit containing at least one current-responsive fuse composed of a fusible electrically conductive material and at least one resistor.

2. A regulator which comprises a plurality of series connected resistors, each resistor being electrically shunted with a current-responsive fuse composed of a fusible electrically conductive material.

3. A regulated battery which comprises a battery in series connection with a regulator comprising a plurality of at least two parallel electrical circuits connected in series, each parallel circuit containing at least one current-responsive fuse composed of a fusible electrically conductive material and at least one resistor.

4. A regulator comprising a plurality of series connected resistors, each resistor being electrically shunted with a current-responsive fuse composed of a fusible electrically conductive material, the fuses being of approximately equal rating and the resistors being of approximately equal resistance.

References Cited by the Examiner

UNITED STATES PATENTS

| 1,492,844 | 5/1924 | Hall | 317—40.1 |
| 2,016,911 | 10/1935 | Stafford | 317—40.1 |
| 2,152,576 | 3/1939 | Weeks | 320—39 X |
| 2,823,338 | 2/1958 | Edsall | 317—40.1 |

FOREIGN PATENTS

| 763,243 | 2/1934 | France. |

LLOYD McCOLLUM, *Primary Examiner.*

MILTON O. HIRSHFIELD, ROBERT L. SIMS,
*Examiners.*